Feb. 26, 1952

S. W. ALLISON

TWO-WAY TRUNK CIRCUIT ARRANGED FOR DIAL-BACK OPERATIONS 2,586,901

Filed July 24, 1948

4 Sheets-Sheet 1

INVENTOR
S. W. ALLISON
BY
R. O. Cowell
ATTORNEY

Feb. 26, 1952

S. W. ALLISON

TWO-WAY TRUNK CIRCUIT ARRANGED
FOR DIAL-BACK OPERATIONS 2,586,901

Filed July 24, 1948

4 Sheets-Sheet 2

INVENTOR
S. W. ALLISON
BY
R. O. Covell
ATTORNEY

Feb. 26, 1952 S. W. ALLISON 2,586,901

TWO-WAY TRUNK CIRCUIT ARRANGED FOR DIAL-BACK OPERATIONS

Filed July 24, 1948 4 Sheets-Sheet 3

INVENTOR
S.W. ALLISON
BY
R. O. Covell
ATTORNEY

INVENTOR
S. W. ALLISON
BY
R. O. Covell
ATTORNEY

Patented Feb. 26, 1952 2,586,901

UNITED STATES PATENT OFFICE 2,586,901

TWO-WAY TRUNK CIRCUIT ARRANGED FOR DIAL-BACK OPERATIONS

Sewell W. Allison, West Orange, N. J., assignor to Bell Telephone Laboratories, Incorporated, New York, N. Y., a corporation of New York Application July 24, 1948, Serial No. 40,584

4 Claims. (Cl. 179—27)

This invention relates to telephone systems and particularly to telephone systems comprising community dial offices and an operator office.

Objects of the invention are an increased efficiency in the handling and completion by an operator of calls between community dial offices, only one of which has direct trunks to an operator office, and the provision of improved circuit arrangements at the operator office for use in completing such calls.

In systems comprising a plurality of community dial offices, one of which has direct trunks to an operator office, calls between dial offices are first extended to an operator and completion of these calls is effected by the so-called dial-back method wherein the same trunk used in extending a call to the operator is used by the operator to complete the call. The operator may be provided with a dial for use in directly controlling switches in the intermediate and terminating dial offices or may be provided with a key set in which case, the digits keyed by the operator are first registered in a register sender and the sender then transmits impulses which are repeated over the trunk to control completion of the described connection. If any of these or other dial offices, to which the sender is adapted to route calls, are arranged to transmit a stop-dial signal until the equipment therein is ready to receive trains of digit impulses and to then transmit a start-dial signal to the operator, the stop-dial signal condition exists when an operator answers a call incoming from a dial office. Furthermore, in order to condition the trunk circuit in the dial office for the control of switches responsive to digit impulses incoming over the trunk used in extending a call to an operator, it has been necessary for the operator to dial a prefix digit followed by the digits which operate the switches through which the desired connection is completed.

This invention is the provision of a trunk circuit, associated in an operator office with a trunk from a dial office, arranged for dial-back operation to complete calls between dial offices and arranged to simulate a start-dial signal on a dial-back call to enable the transmission of impulses from an associated register sender over the trunk to the dial office while a stop-dial signal is being received over the trunk.

A feature of the invention is the provision of a trunk circuit, associated in an operator office with a trunk from a dial office, arranged for dial-back operation to complete calls between dial offices and arranged to automatically transmit a prefix digit to prepare the dial office switches for response to trains of impulses corresponding to the directory number, so that the operator dials or keys the same directory number digits on all calls over the trunk and does not need to dial or key a prefix digit on a dial-back call since the prefix digit is automatically transmitted.

To facilitate a clear and complete understanding of the invention, a telephone system comprising dial and operator offices and trunk circuits embodying the invention and its features is shown schematically in the drawing. Referring to the drawing:

Figs. 1, 2 and 3 show a trunk circuit 40 associated with a two-way trunk T1 interconnecting dial office A and a toll office, the trunk T1 being arranged for composite signaling;

Figures 1, 5:
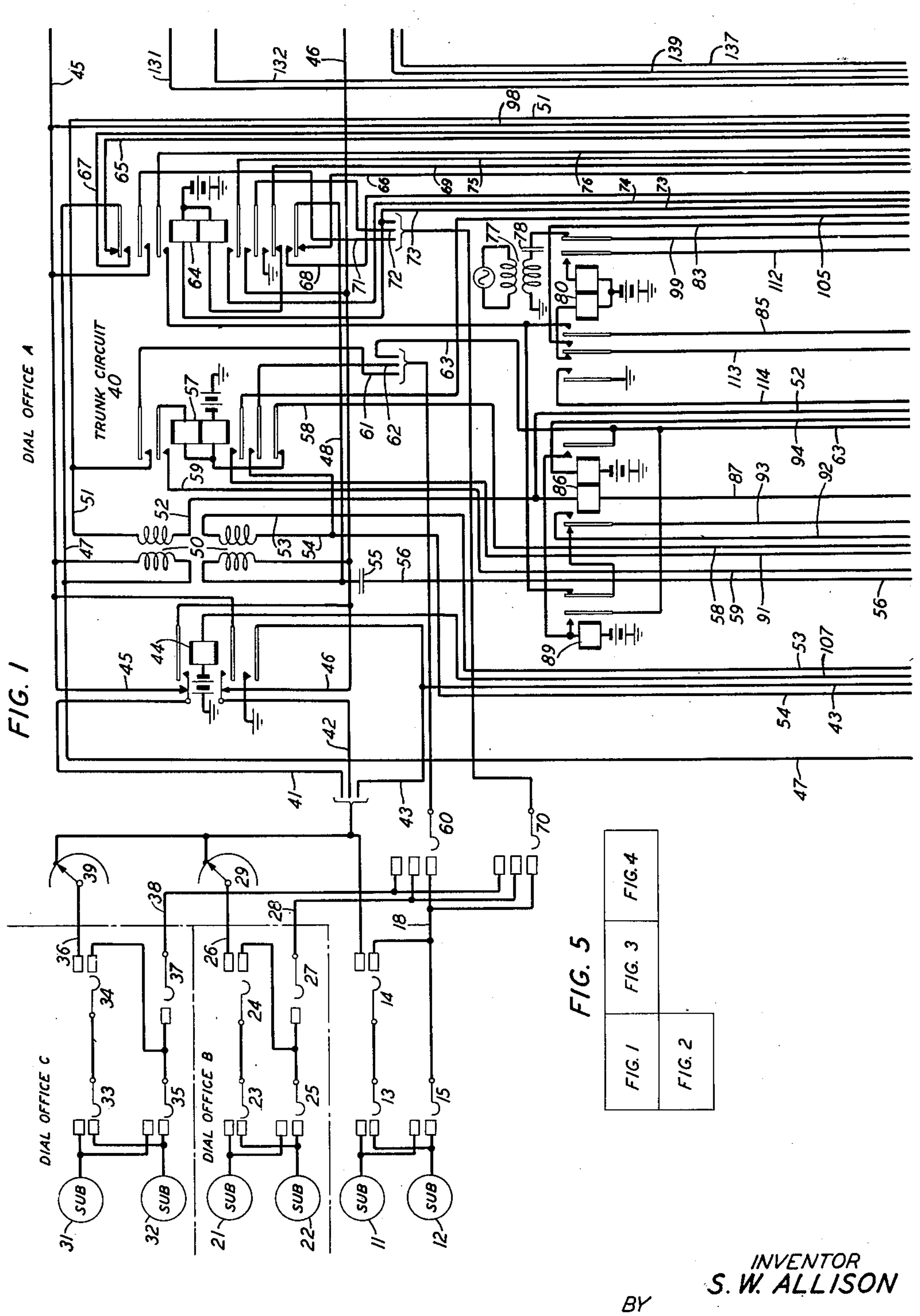
Fig. 1 shows three dial offices A, B and C, the office A being provided with trunks to each of offices B and C and with trunks to a master office.
Figure 2:
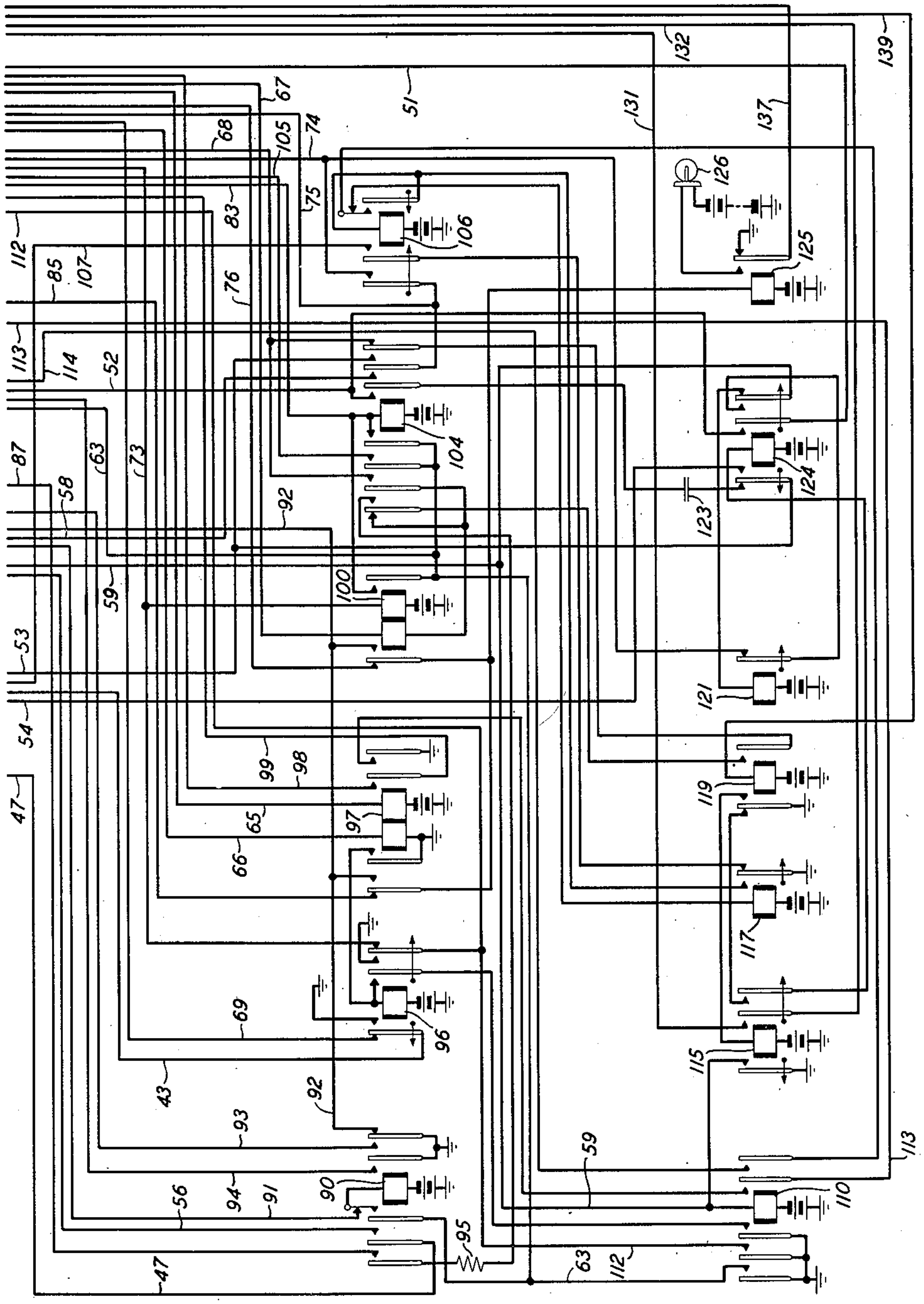
Figures 3, 4A:
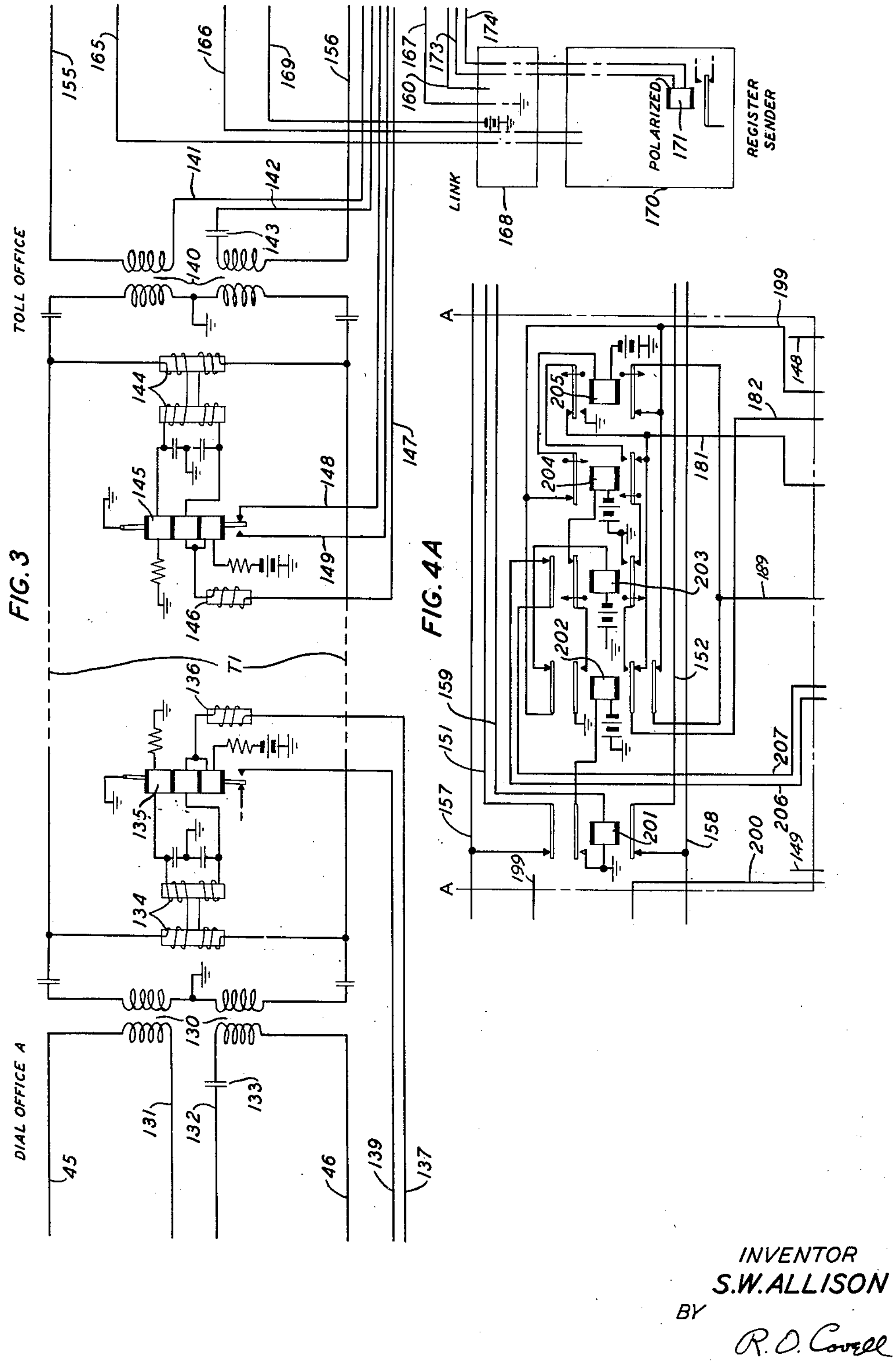
Figure 4:
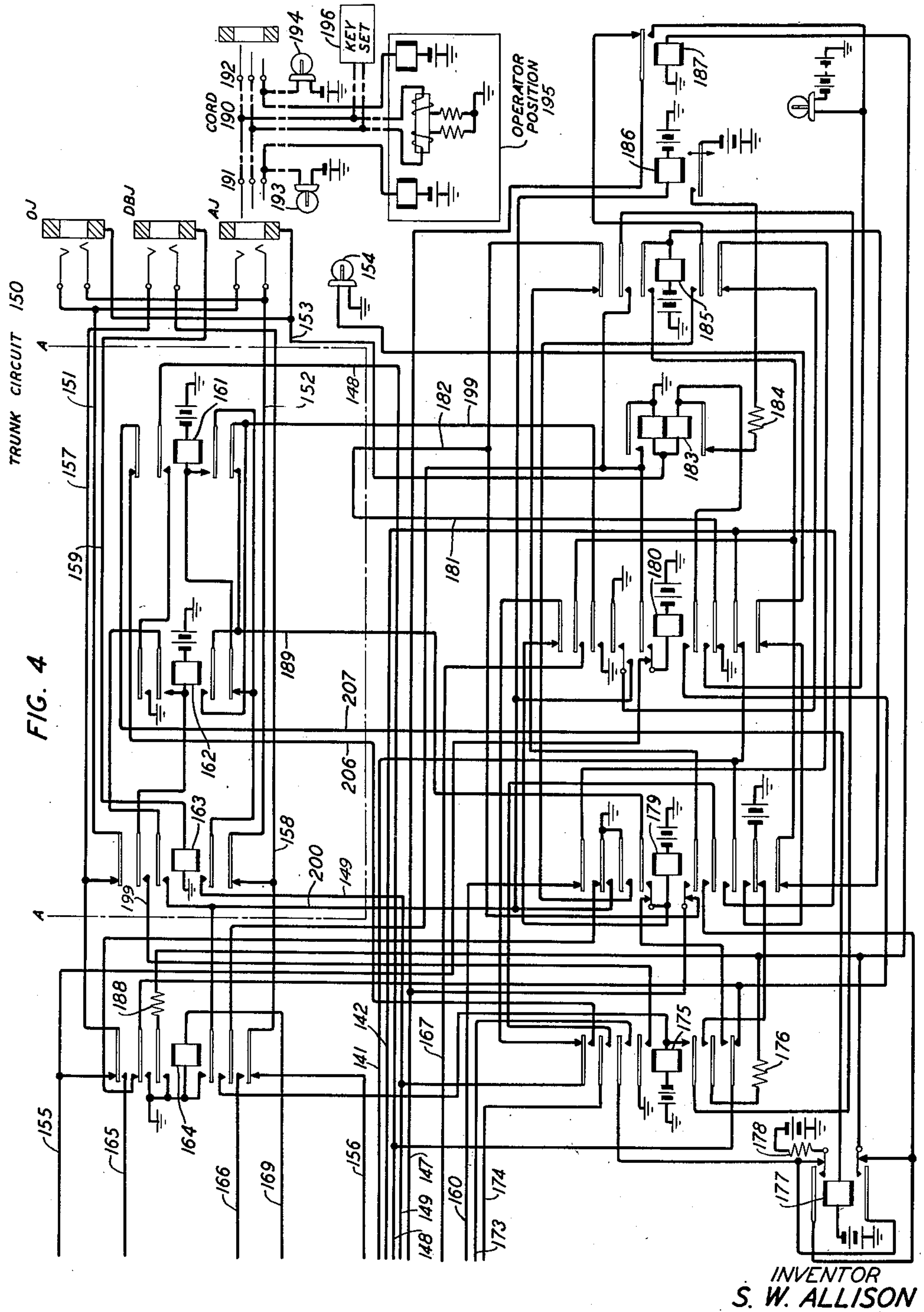

Fig. 4 shows a trunk circuit 150, a cord 190, and operator position equipment 195 and key set 196;

Fig. 4A shows a modification of trunk circuit 150 which may be applied at line A—A in Fig. 4 to arrange this trunk circuit to automatically transmit a prefix digit when a cord is connected to the dial-back jack DBJ; and Fig. 5 shows the relative positions in which Figs. 1 to 4 are to be placed to form an operative arrangement.

Each of the dial offices A, B and C includes line finder, selector and connector switches of the well-known two-motion step-by-step type. The subscriber stations are of the common battery type and include dials for controlling the selector and connector switches to complete desired connections. The subscriber lines terminate in the banks of line-finder switches which operate to connect calling lines to selector switches and also terminate in the banks of connector switches which select called lines. The lines are two-wire lines although represented by a single conductor. Each of the switches comprises a set of brushes and a bank of terminals and is represented in the drawing by a single brush and two or three terminals. Reference may be had to "Automatic Telephony" by Smith and Campbell, 2nd edition, pages 53 to 65 for a description of the structure of two-motion step-by-step switches and their operation when used as selectors and connectors. Reference may be had to Patent 1,799,654 granted April 7, 1931, to R. L. Stokely for description of the operation of a two-motion step-by-step line finder.

In dial office A, subscriber stations 11 and 12 are connected to terminals in the banks of line finders 13 and to terminals in the banks of connectors 15. The line finder 13 is associated with a first selector 14, which has access to groups of connectors, one of which includes connector 15; and also has access to a group of trunks such as T1 extending to the toll office. In dial office B, stations 21 and 22 are connected to terminals in the bands of line finders 23 and connectors 25; and first selectors 24 have access to connectors 25 and also to trunks 26 to dial office A. In dial office C, stations 31 and 32 are connected to terminals in the banks of line finders 33 and connectors 35; and first selectors 34 have access to connectors 35 and also to trunks 36 to dial office A. The trunks 26 and 36 from offices B and C terminate at office A in trunk hunting switches 29 and 39, each of which has access to the trunks T1 extending to the toll office. The switches 29 and 39 may be of the rotary step-by-step type shown in Fig. 4 and described in Patent 2,233,282 granted February 25, 1941 to R. B. Buchanan and C. D. Koechling. Calls between subscribers in any one of offices A, B or C are completed by the switches in that office, but calls originating in any one of these offices and terminating in any other office are routed to the toll office and are completed under the control of an operator. The trunks between dial office A and the toll office may, like trunk T1, be arranged for composite signaling. The trunk circuit 40, to which the trunk T1 is connected in dial office A, has associated therewith two selectors 60 and 70 each of which has access to trunks 18 extending to connectors 15 in office A, to trunks 28 extending to incoming selectors 27 in office B, and to trunks 38 extending to incoming selectors 37 in office C. The trunk circuit 40 is arranged so that selector 70 is controlled by digit impulses incoming over trunk T1 on toll calls to called stations in any one of the dial offices both on calls originating in offices other than dial offices A, B or C and on delayed calls between stations in different ones of offices A, B and C. On calls originating in one of offices A, B or C and terminating in another of these offices which can be completed without delay by dialing back over the trunk T1, a prefix digit is received over trunk T1 to enable the operation of selector 60, the first digit following the prefix digit being effective to control the operation of selector 60. When completing delayed calls over trunk T1 between subscribers in different ones of offices A, B and C, an operator in the toll office first extends a connection which includes selector 70 to the called subscriber station, a prefix digit is then transmitted over trunk T1 to prepare the trunk circuit 40 to control selector 60, and the first digit following the prefix digit controls the operation of selector 60.

The toll office comprises a plurality of operator positions including positions at which the trunks T1 from dial office A are terminated. The trunk circuit 150 associated with trunk T1 in the toll office includes answering, outgoing and dial-back jacks designated AJ, OJ and DBJ, respectively. The operator position includes cords 190 and a key set 196 for use in extending calls over trunks T1 to subscribers' stations in offices A, B and C. Reference may be had to Patent 2,276,515 granted July 4, 1933 to T. D. Robb for disclosure of an operator position and to Patent 1,916,760 granted July 4, 1933 to I. H. Henry and Patent 2,167,710 granted August 1, 1939 to T. F. Crocker for key set, sender and link circuits. The trunk circuit 150 as shown in Fig. 4 is arranged so that it is necessary for the operator to key the prefix digit on dial-back and delayed dial-back calls over trunk T1. If trunk circuit 150 is modified by the substitution of Fig. 4A on line A—A, insertion of a plug in the dial-back jack DBJ automatically effects the transmission of a prefix digit so that the operator may in all cases key the same directory number digits to establish desired connections with calling and called stations in any one of dial offices A, B and C.

*Call from dial office A to toll office*

Assume now that a call is initiated at the subscriber's station 11 in dial office A; that the call is extended through a line-finder switch 13 to a first selector switch 14, and that the selector 14 is operated under the control of a train of dial impulses from the calling station to select an idle trunk circuit 40 associated with the trunk T1 which extends to the toll office. Upon selection of trunk circuit 40, the windings of relay 97 are connected through conductors 65 and 66, back contacts of relay 64, conductors 47 and 48, left windings of repeating coil 50, conductors 45 and 46, back contacts of relay 44, conductors 41 and 42, and through brushes of selector 14 and line-finder 13 to the calling station 11. The operation of relay 97 closes a connection from the ringing tone source 77, through condenser 78, a back contact of relay 80, conductor 99, a front contact of relay 97 and conductor 98, to conductor 45; whereby ringing tone is transmitted to station 11 to indicate that an operator is being signaled. Relay 97 also closes a circuit for operating relay 96 and a circuit including the right back contact of relay 90 for operating relay 125. The operation of relay 96 connects ground to conductor 43 to hold the selector and line-finder switches 14 and 13 in operated position; and opens the normally-closed, idle-indicating connection from battery through the lower winding and a back contact of relay 64, conductor 69 and a back contact of relay 96, to sleeve conductor 43, thereby marking the trunk circuit 40 busy in the banks of switches having access thereto. The operation of relay 125 disconnects ground from signaling conductor 137 and connects signaling battery through lamp 126 to conductor 137 to cause the operation of the composite signaling relay 145 in the toll office. The operation of relay 145 connects ground to incoming signaling conductor 149, thence through the upper back contact of relay 175 and a back contact of relay 180, to the winding of relay 179 of trunk circuit 150. The operation of relay 179 closes a circuit for operating relay 186, closes a circuit including a back contact of relay 180 for lighting the answering lamp 154, and bridges the talking condenser 143 across the inner ends of the right windings of repeating coil 140. The operation of relay 186 connects battery through resistor 184, a back contact and lower winding of relay 183 to the sleeve conductor 153 of answering jack AJ and the associated outgoing jacks (not shown) to establish a busy marking condition at the outgoing jacks. In case the trunk circuit 150 is also accessible to selectors of an intertoll train, this busy marking potential is further connected to the test terminal in the banks of the selectors.

When a toll operator answers the call by inserting the plug 191 of a cord 190 in answering jack AJ, a circuit is closed for operatively energizing the upper winding of relay 183. When the plug is fully seated, a circuit is closed for operating relay 180, this circuit including the winding and continuity back contact of relay 180, a back contact of relay 164, a back contact of relay 163, tip conductors of jack AJ and plug 191, to ground in the position circuit 195. Relay 180 closes a locking circuit which is under control of relay 183, opens its own operating circuit, closes a locking circuit for relay 179 which includes a back contact of relay 161, opens the circuit for lighting the answering lamp 154, and transfers the outgoing signaling conductor 147 from ground to signaling battery, the connection between conductor 147 and the transfer contact spring of relay 180 being traced through a back contact of relay 185 and the inner lower front contact of relay 179. The connection of signaling battery to conductor 147 causes the operation of the composite signaling relay 135 in dial office A. The circuit for operatively energizing the middle and lower windings of relay 135 is further traced from conductor 147, through retard coil 146, middle winding of relay 145, lower windings of coils 144, lower conductor of trunk T1, lower windings of coils 134, middle and lower windings of relay 135 and biasing battery to ground in dial office A. The operation of relay 135 connects ground to conductor 139, thereby causing the operation of relay 119 of trunk circuit 40. The operation of relay 119 closes a circuit for operating relay 115. The operation of relay 115 closes circuits for operating relays 110 and 121 and bridges talking condenser 133 across the left windings of repeating coil 130. The operation of relay 110 connects ground to conductors 63 and 112; closes a locking circuit for relay 96; and closes a circuit for operatively energizing the left winding of relay 80, this circuit including the left winding and outer left back contact of relay 80, conductor 113, inner right front contact of relay 110 to ground at the outer right front contact of relay 97. The operation of relay 80 first closes a locking circuit through its right winding and inner right front contact, over conductor 112 to ground at a front contact of relay 110; then opens the operating circuit through its left winding and closes a circuit including conductors 113 and 83 for operating relay 104; closes a circuit including conductor 114 for operating relay 117; and opens the connection between ringing tone source 77 and conductor 45 to terminate the transmission of ringing tone to the calling station 11. Relay 104 locks to conductor 63 independent of relay 80 and bridges the talking condenser 123 across the right-hand windings of repeating coil 50. The operation of relay 117 closes a circuit for operating relay 106. Relay 106 locks through a front contact of relay 110 and conductor 114 to ground at a front contact of relay 80. The operation of relay 106 causes the release of relay 117; and the release of relay 117 opens the operating circuit of relay 106 and closes a circuit including conductor 107 for operating relay 44. The operation of relay 44 interchanges the connection between conductors 41 and 42 and the windings of relay 97 thereby reversing the current in the loop circuit including the calling station 11.

The toll operator now receives the called office code and number from the calling subscriber; and, if the connection is to be completed over an outgoing trunk, the plug 192 is connected to an outgoing trunk jack associated with a trunk (not shown) leading to the called office. Talking battery is supplied to the calling station through the windings of relay 97 and the left windings of repeating coil 50 and the talking connection between the calling subscriber and the cord 190 includes repeating coil 130, the conductors of trunk T1, repeating coil 140, conductors 155 and 156, back contacts of relays 164 and 163, conductors 151 and 152 and the tip and ring conductors of jack AJ and plug 191. The calling subscriber may flash the toll cord supervisory lamp 193 by switchhook operations which cause the alternate release and reoperation of relays 97 and 125 in succession. The alternate release and reoperation of relay 125 causes the transfer of signaling conductor 137 from signaling battery to ground and back to signaling battery, thereby effecting the release and reoperation of the composite signaling relay 145 in the toll office. Each time relay 145 releases, ground is connected to conductor 148, thence through a back contact of relay 175 and a front contact of relay 180 to the low-resistance, lower winding of relay 183 thereby increasing the current through the sleeve conductor of plug 191 to light lamp 193; and when relay 145 reoperates, ground is disconnected from conductor 148 to extinguish lamp 193.

When the calling subscriber replaces the receiver on the receiver hook to terminate the call, the release of relays 97 and 125 causes the release of relay 145 and lamp 193 is lighted as a disconnect signal. When the toll operator disconnects plug 191 from jack AJ, lamp 193 is extinguished and relay 183 releases. The release of relay 183 causes the release of relay 180; and the release of relay 180 causes the release of relay 179. With relays 179 and 180 released, the signaling conductor 147 is disconnected from signaling battery and connected to ground, thereby causing the release of composite signaling relay 135 in dial office A. The release of relay 135 causes the release of relay 119. The release of relay 119 causes the operation of relay 124 and the release of relay 115. The operation of relay 124 causes the release of relay 121. The release of relay 115 causes the release of relays 110 and 124 and opens the bridge across the left windings of repeating coil 130. The release of relay 110 causes the release of relays 96, 104 and 106. The release of relay 106 causes the release of relay 44; and the release of relay 96 causes the release of relay 80 and reconnects battery through the lower winding of relay 64 to sleeve conductor 43, thereby to mark the trunk circuit 40 as idle in the banks of all selectors having terminals connected to the trunk circuit 40.

*Call from dial office A to dial office B*

Assume next that the subscriber at station 11 originates a call which is extended over trunk T1 to the toll operator and answered by connection of a plug 191 to jack AJ, and that the called station is a station 22 in dial office B. In this case, the call is completed by dialing back over trunk T1 to selectively operate the selector 60 associated with trunk circuit 40 to select an idle trunk terminating in an incoming selector in dial office B, and to selectively operate this incoming selector and a connector to establish connection with the line of the called station. While the dial-back operation may be directly effected by a position dial, the trunk circuit and operator position shown in Fig. 4 are arranged for key set operation and in this case the digit signals are first registered in a register sender and trains of impulses are then transmitted, under control of the sender, over trunk T1. The toll operator connects the plug 192 of cord 190 in the dial-back jack DBJ, thereby closing a circuit through the sleeve conductor of plug 192 for operating relay 163. The operation of relay 163 opens the connection between conductors 155 and 156 and jack AJ, and connects the incoming signaling conductor 149 through a back contact of relay 162 to the winding of relay 161. Since relay 145 is operated at this time, conductor 149 is connected to ground and relay 161 operates. Relay 161 locks to conductor 149, independent of relay 162, opens the locking circuit of relay 179 causing this relay to release, and opens the connection between conductors 206 and 207 thereby to prevent the operation of relay 177 when a sender is connected to trunk circuit 150. With relay 180 operated and relay 179 released, the link start conductor 160 is connected through a back contact of relay 179 and a back contact of relay 185 to ground at a front contact of relay 180 to cause the operation of a link circuit to effect the connection of an idle sender to the trunk circuit 150. When a link 168 connects with trunk circuit 150, ground is connected in the link to conductor 167 thence through a front contact of relay 180 and a back contact of relay 179 to the winding of relay 185. Relay 185 operates and locks to conductor 167 independent of relay 179. When an idle sender is associated with trunk circuit 150, battery in the link is connected through conductor 169 to the winding of relay 164. Relay 164 operates, disconnecting conductors 155 and 156 from jack DBJ and establishing a connection from the key set 196 through tip and ring conductors of plug 191 and jack DBJ, conductors 157 and 158, front contacts of relay 164, conductors 165 and 166 and link circuit 168 to the sender 170; and when the digits of the called line number are keyed by the operator, key set impulses are transmitted over conductors 165 and 166 to register the keyed digits in the sender 170. The operation of relay 164 connects ground to register 188 so that resistor 188 is in parallel with the winding of relay 187; and closes a circuit for operating relay 175. Relay 175 locks under control of relays 185 and 183, closes a circuit from battery through the lowermost back contact of relay 179 and resistor 176 for operating relay 187, and closes a circuit including a front contact of relay 163 for operating relay 162. Although relay 145 is operated so that conductor 149 is connected to ground, the operation of relay 175 is ineffective to operate relay 177 due to the fact that the connection between conductors 206 and 207 is opened by the operation of relay 161. The operation of relay 187 connects signaling battery to the outgoing signaling conductor 147 independent of relays 179 and 180. Relay 162 locks independent of relay 175 under the joint control of relays 163 and 180. The operation of relay 162 opens the operating circuit of relay 161 and closes a circuit for operating relay 179, this circuit being traced from ground at the outer upper front contact of relay 162, through a front contact of relay 161, conductor 148, outer lower front contact of relay 175, continuity contact and winding of relay 179 to battery. Relay 179 opens its operating circuit after closing a locking circuit which includes the inner lower front contact of relay 162, conductor 199 and a front contact of relay 180. The operation of relay 179 disconnects ground from the link start conductor 160; closes an additional ground connection for the locking circuit of relay 162; opens the connection which includes a front contact of relay 180 between the signaling battery and the outgoing signaling conductor 147 so that the connection of signaling battery and ground to conductor 147 is under the sole control of relay 187; opens the circuit through resistor 176 and winding of relay 187; and closes a circuit for energizing relay 187 under the control of an impulse transmitting relay (not shown) in the sender 170. The last-mentioned circuit is traced from battery through resistor 178, a back contact of relay 177, a front contact of relay 175, conductor 173, through the link, through sender 170 including the winding of polarized relay 171, conductor 174, a front contact of relay 175, a front contact of relay 179, a back contact of relay 177, and through the winding of relay 187 to ground. The impulse transmitting relay of the sender is thus rendered effective to transmit trains of impulses in this circuit to relay 187, and these impulses are repeated by relay 187 over conductor 147 and lower conductor of trunk T1 to control the composite signaling relay 135. The digits thus transmitted consist of a prefix digit which prepares the trunk circuit 40 for control of selector 60 followed by one digit for operating this selector and digits for operating an incoming selector 27 and a connector 25 in the called office B.

When relay 135 receives the digit impulses from the toll office, it repeats these impulses to relay 119. Each impulse causes the release and reoperation of relay 119, the release of relay 119 responsive to the first impulse of each train being effective to operate relay 124. Relay 124 is slow to release and remains operated during receipt of each train of impulses and releases only during the intervals between digits. Relay 115 is also slow in releasing and remains operated during the response of relay 119 to digit impulses. The operation of relay 124 opens the circuit for energizing the winding of relay 121; and the prefix digit train of impulses will consist of enough impulses to cause the release of relay 121. The release of relay 121 closes a circuit from battery through the lower winding and a back contact of relay 57, conductor 58, a front contact of relay 104, a front contact of relay 106, back contact of relay 121, outer right front contact of relay 124, to ground at the left front contact of relay 115. Relay 57 is thus energized sufficiently to close its upper locking contact, the upper winding of relay 57 being short-circuited as long as relay 124 remains operated. When relay 119 remains operated after the last impulse of the prefix digit, relay 124 releases thereby opening the short circuit across the upper winding of relay 57; whereupon relay 57 is completely operated by the energization of both windings in series, through the locking and contact and conductor 59 to ground at a front contact of relay 115. The complete operation of relay 57 closes a circuit for operating relay 90, this circuit being traced from the winding of relay 90 through its continuity back contact, conductor 91, inner lower front contact of relay 57, conductor 105, a front contact of relay 104, to ground at a front contact of relay 110. Relay 90 locks through its continuity front contact directly to the contact of relay 110, bridges condenser 55 across the inner ends of the left windings of repeating coil 50, causes the release of relay 125, closes a circuit including conductor 94 for energizing the right winding of relay 86, and closes a bridge across the tip and ring conductors 61 and 62 of selector 60. This bridge is traced from conductor 61 of selector 60, through the outer upper front contact of relay 57, upper right winding of repeating coil 50, left winding of relay 86, conductor 87, outer left front contact of relay 90, resistor 95, outer left front contact of relay 104, right front contact of relay 119, a right front contact of relay 104, conductor 53, lower right winding of repeating coil 50, and through another front contact of relay 57 to conductor 62. Relay 86 does not operate since its windings are differentially energized at this time. The closure of the bridge across conductors 61 and 62 of selector 60 prepares this selector for operation in response to the next train of digit impulses received by relay 135 and repeated to relay 119. The aforementioned release of relay 125, when relay 90 operates, connects ground to signaling conductor 137 in place of signaling battery thus causing the release of relays 145 and 161 in the toll office. The release of relay 161 places the back contact of relay 145 in control of the operator's cord supervisory lamp 193 after relay 175 releases.

The impulses of the first train received by relay 135 and repeated to relay 119, following the operation of relay 90, are repeated by relay 119 over conductors 61 and 62 to selectively operate selector 60 to select a level in which the terminals are connected to trunks to the called dial office B. The selector 60 thus selects an idle trunk 28 and the following trains of impulses are received by relay 135 and repeated by relay 119 over conductors 61 and 62 and trunk 28 to operate the associated incoming selector 27 and a connector 25 to complete the connection to the line of the called station 22. After the sender 170 is through transmitting trains of impulses to relay 187, ground is disconnected from conductor 167 thereby causing the release of relay 185 of trunk circuit 150. The release of relay 185 again places the outgoing signaling conductor 147 under the control of relay 180. A short interval after relay 185 releases, the connection of battery to conductor 169 is opened in the link and relay 164 releases. The release of relay 164 causes the release of relay 175; disconnects conductors 165 and 166 from dial jack DBJ; and connects conductors 155 and 156 to dial jack DBJ so that there is a talking connection between the called station and the toll operator, if the plug 192 is not immediately disconnected from jack DBJ after keying is completed. The release of relay 175 disconnects conductors 173 and 174 from resistor 178 and relay 187 and reconnects conductor 148 to the lower winding of relay 183. The calling subscriber may then flash the operator by actuating the receiver hook, the release and reoperation of relay 97 of trunk circuit 40 causing operation and release of relay 125 and the corresponding operation and release of relay 145. The circuit for operating relay 125 is traced from the winding of relay 125 through the back contact of relay 97, conductor 85, a front contact of relay 80, back contacts of relays 89 and 86, and conductor 93, to ground at a front contact of relay 90. The operation and release of relay 145, after relay 161 has released, disconnects and reconnects ground to the lower low resistance winding of relay 183 thereby flashing lamp 193. The plug 192 may be disconnected from jack DBJ as soon as keying of the digits is completed. When plug 192 is disconnected from jack DBJ relays 163 and 162 release.

If and when the called subscriber answers, the current is reversed through the conductors of trunk 28 and through the bridge across conductors 61 and 62, thereby causing the energization of the left winding of relay 86 to aid the right winding, so that relay 86 operates. The operation of relay 86 closes a circuit including conductor 63 for operating relay 89; and closes a circuit including conductors 92 and 93 and front contacts of relays 90 and 97 for operating relay 125. The operation of relay 125 reconnects signaling battery to conductor 137 to again operate relay 145 in the toll office and thus cause the supervisory lamp 193 to be extinguished. The talking connection betwen the calling station 11 in dial office A and the called station 22 in dial office B includes repeating coil 50. Either the calling or called subscriber may flash the operator, relay 97 being controlled by the calling station 11 and relay 86 being controlled by the called station 22; and the release and reoperation of either of relays 97 and 86 causes the release and reoperation of relay 125 to transmit a signal over the composite signaling circuit and thus effect the flashing of supervisory lamp 193 of cord 190. The connection is held under the control of the toll operator. When plug 191 of cord 190 is disconnected from jack AJ, relays 183, 180 and 179 release in succession. With both of relays 179 and 180 released, relay 186 releases, thereby terminating the busy marking of the outgoing jacks to which trunk 150 is connected; and signaling conductor 147 is again connected through back contacts of relays 179 and 180 to ground, thus causing the release of relays 135 and 119 in dial office A. The release of relay 119 causes the operation of relay 124 and the release of relay 115. The operation of relay 124 causes the release of relay 121. The release of relay 115 causes the release of relays 124, 110 and 57. The release of relay 57 opens the bridge across conductors 61 and 62 of selector 60 thereby causing the release and return to normal of selector 60 and the release and return to normal of selector 27 and connector 25 in dial office B. The release of relay 110 causes the release of relays 89, 90, 96, 104 and 106; the release of relay 90 causes the release of relay 86; the release of relay 106 causes the release of relay 44; and the release of relay 96 causes the release of relay 80 and disconnects ground from conductor 43. When holding ground is disconnected from conductor 43, the selector 14 and line finder 13 are released and restored to normal.

*Calls from toll office to dial offices*

Assume next that a toll operator answers a call with plug 191 of cord 190 and that the call is one which is to be completed over a trunk between the toll office and dial office A. Many of the circuit operations are similar to those hereinbefore described and will not require a detailed tracing of the circuits. When the plug 192 is connected to jack OJ, a circuit is closed through the sleeve conductor of the plug and jack for operating relay 183 and a circuit is closed through the tip conductor of the plug and jack for operating relay 180. Relay 180 locks under control of relay 183; closes a circuit for operating relay 186; transfers signaling conductor 147 from ground to signaling battery, to operate relay 135 in the dial office A; connects ground to conductor 160 to effect the operation of a link, whereby an idle sender 170 is connected through the link to the trunk circuit 150 as hereinbefore described; and closes a connection from ground at the middle upper back contact of relay 179 and a back contact of relay 164 to the lower, low-resistance winding of relay 183, thereby to effect the lighting of cord supervisory lamp 194. When a link connects with trunk circuit 150, relay 185 operates; and, when an idle sender is connected to trunk 150, relays 164 and 175 are operated. The operation of relay 175 closes a circuit for operating relay 179, this circuit including conductor 148 and the back contact of composite signaling relay 145. The operation of relay 175 also connects the winding of relay 177 to conductor 149 so that a stop-dial signal incoming to relay 145 will cause the operation of relay 177 and thus reverse the current through conductors 173 and 174 to operate relay 171 and thereby prevent the transmission of digit impulses to relay 187. With relays 164, 175, 179, 180, 183 and 185 operated, the sender is ready to register the digits keyed by the operator; and relay 187 is connected for operation under the control of the impulse transmitting relay in the sender.

When signaling battery is connected to conductor 147, responsive to seizure of trunk circuit 150, the operation of composite signaling relay 135 in dial office A closes the circuit for operating relay 119; and relay 119 closes the circuit for operating relay 115. The operation of relay 115 bridges condenser 133 across the left windings of repeating coil 130, and connects ground to conductor 59 to operate relays 110 and 121. The operation of relay 110 connects ground to sleeve conductor 63 of selector 60 and connects ground through conductor 112 and a back contact of relay 96 to sleeve conductor 73 of selector 70, to the upper winding of relay 64, and to the right winding of relay 100. Relay 64 operates, opens the connection between the lower winding of relay 64 and conductor 43, and connects ground through conductor 69, and a back contact of relay 96 to conductor 43, thereby to guard against seizure of trunk circuit 40 by any of selectors 14 or trunk hunting switches 29 and 39. The operation of relay 64 disconnects the windings of relay 97 from the left windings of repeating coil 50 and closes a bridge including the left windings of repeating coil 50, conductors 67 and 68, the left winding of relay 100, back contacts of relay 104 and the right front contact of relay 119 across the tip and ring conductors 71 and 72 of selector 70, thereby preparing selector 70 for operation responsive to digit impulses received by relay 135 and repeated to relay 119. Relay 100 does not operate at this time due to the fact that its windings are energized in opposing directions.

When the operator keys the particular digits required for completing the call, these digits are registered in the sender and relay 187 is operated under the control of the impulse transmitting relay in the sender to transmit trains of impulses corresponding to these digits over trunk T1 to the composite signaling relay 135; and relay 135 repeats these impulses to relay 119. Relay 124 is operated by the release of relay 119 responsive to the first impulse of each digit train and remains operated until all of the impulses of a train have been received by relay 119. The selector 70 is selectively operated responsive to the first train of impulses repeated by relay 119 to select a trunk 18 which extends to a connector 15 if the line of the called station terminates in dial office A, to select an idle trunk 28 which extends to an incoming selector 27 in dial office B if the line of the called station terminates in dial office B, or to select a trunk 38 which extends to an incoming selector 37 in dial office C if the line of the called station terminates in dial office C. In each case, the succeeding trains of impulses effect the completion of the connection between the toll office and the called line. When the call is answered, the reversal of current over conductors 71 and 72 causes the operation of supervisory relay 100. The operation of relay 100 closes circuits for operating relays 104 and 125. The operation of relay 125 transfers the outgoing signaling conductor 137 from ground to signaling battery to operate the composite signaling relay 145 in the toll office; and relay 145 disconnects ground from the lower winding of relay 183 to extinguish the cord supervisory lamp 194. Relay 104 locks independent of relay 100 and bridges the left winding of relay 100 across conductors 71 and 72 independent of relay 119. The talking connection between the called station and trunk T1 includes repeating coils 50 and 130. When the called subscriber replaces the receiver on the receiver hook, the current through conductors 71 and 72 is again reversed causing the release of relays 100 and 125 in succession. The release of relay 125 disconnects signaling battery and reconnects ground to conductor 137 causing the release of signaling relay 145 in the toll office; and the release of relay 145 causes the lamp 194 to light as a disconnect signal. When the operator disconnects from jack OJ, relays 183, 180 and 179 are released in succession, and the outgoing signaling conductor 147 is disconnected from signaling battery and reconnected to ground, causing the release of composite signaling relay 145 in dial office A. The release of relay 145 causes the successive release of relays 119, 115, 110 and 104. The release of relay 119 also opens the bridge across conductors 71 and 72 to effect the release and return to normal of the selector and connector switches through which connection with the called line was established. The release of relay 110 also causes the release of relay 64, the trunk circuit 40 thus being restored to normal, ready for use on another call.

*Delayed calls between dial offices*

When a subscriber in any one of the dial offices calls a subscriber station in another one of these offices and the call cannot be immediately completed, it may be completed later by an operator in the toll office. In this case, the operator connects one plug of a cord 190 with an outgoing jack OJ and extends the connection to the called line in the same manner as above described on a call incoming from another toll office. After the called subscriber answers, the operator asks the subscriber to wait until connection is established to the calling subscriber. To effect this connection, the operator connects the other end of cord 190 to the dial-back jack DBJ, causing the operation of relay 163. Relay 163 disconnects the tip and ring conductors of jack OJ from the tip and ring conductors of jack DBJ to prevent interference with key pulsing, and closes a circuit for operating relay 161. Relay 161 locks independent of relay 162 and opens the locking circuit of relay 179. Relay 179 releases thereby connecting ground to the link start conductor 160. When a link 168 connects with trunk circuit 150, relay 185 is operated, and when an idle sender is connected through the link to trunk circuit 150, relays 164 and 175 operate in succession. The operation of relay 175 closes a circuit for operating relay 162. Relay 162 locks under control of relay 163, opens the operating circuit of relay 161, and connects ground to conductor 148 to reoperate relay 179. When relay 179 operates, the key pulsing circuits are completed from the key set 196, through cord 190, jack DBJ, front contacts of relay 164 and conductors 165 and 166; and the keying of the digits required for completing a connection to the calling station effects the registration of these digits in the sender. The sender then controls relay 187 to transmit the registered digits over trunk T1 to the composite signaling relay 135 in dial office A in the manner hereinbefore described; and the digit impulses are repeated by relay 135 to relay 119. The first digit is a prefix digit which consists of a large enough number of impulses to insure the release of relay 121 of trunk circuit 40 while relay 124 is operated during the response of relay 119 to this train of impulses. The release of relay 121 closes the circuit for energizing the lower winding of relay 57, thereby partially operating relay 57. When relay 124 releases at the end of the prefix digit train, the upper winding of relay 57 is energized to complete the operation of this relay. The operation of relay 57 closes a circuit for operating relay 90 and connects conductors 61 and 62 to the right windings of repeating coil 50. The operation of relay 90 connects the left winding of relay 86 and resistor 95 in series with front contacts of relays 104 and 119 across the inner ends of the right windings of repeating coil 50, thereby preparing the selector 60 for operation responsive to the next train of impulses received by relay 119. The selector 60 is then operated to select a trunk through which the connection to the called subscriber line can be completed; and the succeeding digits effect the completion of the desired connection. The aforementioned operation of relay 90 caused the release of relay 125, whereby ground was reconnected to conductor 137 to release relays 145 and 161 in the toll office and thereby effect the lighting of the cord supervisory lamp in the manner hereinbefore described. When all of the digits have been transmitted from the sender, relay 185 is released first; and then relays 164 and 175 are released in succession. When the operator disconnects cord 190 from the dial-back jack DBJ, relays 163 and 162 are released. The cord is, however, not disconnected from jack OJ until the connection between the calling and called subscriber stations is to be released. When the calling subscriber answers, relay 86 operates. Relay 86 closes circuits for operating relays 89 and 125. Relay 125 reconnects signaling battery to conductor 137 to operate relay 145 in the toll office and thus extinguish the cord supervisory lamp. Relay 89 locks under control of relay 110. The talking connection includes repeating coil 50, the right windings of coil 50 being connected through contacts of relay 57, conductors 61 and 62 and selector 60 to the calling subscriber station and the left windings of coil 50 being connected through contacts of relay 64, conductors 71 and 72 and selector 70 to the called subscriber station. Relay 125 is under the control of both of relays 86 and 100 so that relay 125 responds to flashing at either of the connected subscriber stations; and relay 125 transmits the flashing signal received by either of relays 86 or 100 to relay 145 to flash the cord supervisory lamp. Release is effected in the manner hereinbefore described when the operator disconnects cord 190 from jack OJ.

By inserting Fig. 4A on line A—A of Fig. 4, the trunk circuit 150 is modified so that a prefix digit is automatically transmitted responsive to the insertion of the plug of a cord into the dial-back jack DBJ; so that in all cases, the operator keys only the directory number to extend connections to subscribers in dial offices A, B and C. When so modified, the locking circuit of relay 179 includes a back contact of relay 202 in parallel with a back contact of relay 205; and the connection between conductors 181 and 182 normally includes a back contact of relay 202.

Assume now that an operator is completing a dial-back or a delayed call, relays 179 and 180 having been operated as hereinbefore described. The outgoing signaling conductor 147 is connected through the inner lower front contact of relay 179, upper back contact of relay 185, conductor 182, lower back contact of relay 202, conductor 181 and a front ocntact of relay 180 to signaling battery. The operation of relay 180 connects ground to conductor 199 causing the operation of relays 203 and 205. When the plug of a cord is inserted in jack DBJ, a circuit is closed through the sleeve conductors of the cord and jack for operating relay 201. The operation of relay 201 disconnects the talking conductors of jacks OJ and AJ from the trunk T1 and closes a circuit for operating relay 202. With both of relays 202 and 205 operated, the locking circuit of relay 179 is opened and relay 179 releases. The operation of relay 202 opens the connection between outgoing signaling conductor 147 and signaling battery and connects conductor 147 to ground at the lower front contact of relay 203. The operation of relay 202 causes the release of relay 203; but relay 203 is slow in releasing so as to maintain the connection of ground to conductor 147 long enough to effect the release of signaling relay 135 in dial office A. When relay 203 releases, the outgoing signaling conductor 147 is disconnected from ground and connected through a back contact of relay 203, a back contact of relay 204, conductor 181, and a front contact of relay 180 to signaling battery. The release of relay 203 causes the operation of relay 204, relay 204 being slow in operating so as to maintain the connection of signaling battery to conductor 147 long enough to effect the reoperation of signaling relay 135 in dial office A. The operation of relay 204 connects outgoing signaling conductor 147 to ground at the upper front contact of relay 205 and causes the release of relay 205. Relay 205 is slow in releasing so as to maintain the connection of ground to signaling conductor 147 long enough to effect the release of relay 135 in dial office A. The release of relay 205 disconnects ground from conductor 147 and reconnects conductor 147 through contacts of relays 179 and 185, conductor 182, a front contact of relay 202, a back contact of relay 203, a front contact of relay 204, a back contact of relay 205, conductor 181 and a front contact of relay 180 to signaling battery, whereby signaling relay 135 in the dial office A is reoperated. Thus the described operations of relays 201 to 205 have transmitted the prefix digit 2 over the composite signaling channel to relay 135 in dial office A. In response to this prefix digit, relay 121 of trunk circuit 40 is released long enough to effect the operation of relays 57 and 90 as hereinbefore described; so as to prepare selector 60 for response to the succeeding trains of digit impulses transmitted when the toll operator keys the directory number of the subscriber's station with which connection is to be established. The aforementioned release of relay 179 effects the connection of ground to link start conductor 160 and when a sender has been connected to trunk circuit 150, relays 164 and 175 are operated. The operator then keys the directory number, the sender registers and retransmits these digits, and relay 187 repeats these digit impulses over the composite signaling circuit to relay 135 in dial office A, all as hereinbefore described on dial-back or delayed calls. When the plug is disconnected from jack DBJ, relays 201, 202 and 204 release in succession.

What is claimed is:

1. In a telephone system comprising an operator's position, a dial office and trunks, one of said trunks interconnecting said dial office and position, an outgoing jack and a dial-back jack at said position, a trunk circuit connecting one end of said one trunk to said jacks, a signal relay in said trunk circuit operatively responsive to signals incoming over said trunk from said dial office, a key set at said position, cords for connecting either of said jacks with said key set, register senders, means effective upon connection of a cord to either of said jacks to connect a register sender to said trunk circuit, means in said register sender for registering digits under the control of said key set, means comprising said register sender and trunk circuit for transmitting digit impulses over said trunk, a control relay in said trunk circuit, means for operating said control relay responsive to operation of said signal relay, relay means in said sender circuit rendered effective by the operation of said control relay to prevent the transmission of impulses over said trunk, and means comprising a relay operated upon connection of a cord to said dial-back jack for preventing the operation of said control relay thereby to enable the transmission of impulses over said trunk while said signal relay is operated.

2. In a telephone system, a dial office and a manual office comprising an operator position, a trunk between said offices, a first two-way trunk circuit associated with said trunk in said dial office and a second two-way trunk circuit associated with said trunk in said manual office, subscriber lines in said dial office, means comprising said trunk and two-way trunk circuits for connecting a calling line to said position, an answering jack and a dial-back jack for said second trunk circuit, means including a cord at said position and said answering jack for answering calls incoming over said trunk, a selector switch associated with said first two-way trunk circuit, means comprising a cord at said position and said dial-back jack for transmitting a train of digit impulses over said trunk to control the operation of said selector, means in said second trunk circuit automatically effective responsive to the connection of a cord to said dial-back jack for transmitting signal impulses for a predetermined prefix digit over said trunk to said first trunk circuit, and means in said first trunk circuit responsive to said prefix digit impulses for operatively connecting said selector to said first trunk circuit.

3. In a telephone system comprising a manual office and first and second dial offices, a first trunk and a second trunk, said first trunk interconnecting said first and second dial offices, said second trunk interconnecting said second dial office and said manual office, an operator position in said manual office, subscriber lines in each of said dial offices, a first two-way trunk circuit terminating said second trunk in said second dial office, and a second two-way trunk circuit terminating said second trunk in said manual office, means comprising automatic switching means in said first dial office for connecting a calling line therein to said first trunk, means comprising automatic switching means in said second dial office for connecting a calling line therein to said first two-way trunk circuit, means comprising said first trunk and said second trunk for at times connecting a calling line in said first dial office to said operator position, means comprising said second trunk for at times connecting a calling line in said second dial office to said operator position, means comprising an answering jack and a cord at said operator position for answering calls incoming over said second trunk to the manual office, a key set at said operator position, a key set sender, outgoing and dial-back jacks for said second trunk circuit, means comprising a cord and either an outgoing or a dial-back jack associated with said trunk circuit for connecting said key set to said sender, means in said sender controlled by said key set for registering the digits of the directory number of any subscriber in said dial offices, means in said sender and second trunk circuits for transmitting digit impulses corresponding to said registered digits over said second trunk to said first trunk circuit, a selector in said second dial office, means in said second two-way trunk circuit automatically effective only upon connection of a cord to said dial-back jack for transmitting a predetermined prefix digit over said trunk to said first two-way trunk circuit, and means in said first two-way trunk circuit responsive to the prefix digit for preparing said selector for response to the train of impulses corresponding to the first digit of a called subscriber's number.

4. In a multioffice telephone system, an operator position, a two-way trunk extending from said position to a dial office, a trunk circuit connected to one end of said trunk comprising an outgoing jack and a dial-back jack at said position, means comprising a signal relay in said trunk circuit responsive to signals incoming over said trunk from said dial office, means associated with said trunk circuit for sending selective signals over said trunk to said dial office, circuit means comprising said outgoing jack and a control relay in said trunk circuit operatively energized while said signal relay is operated for preventing the transmission of selective signals over said trunk to said dial office, and circuit means including said dial-back jack for preventing the operation of said control relay thereby rendering said signal sending means effective to transmit selective signals over said trunk to said dial office while said signal relay is operated.

SEWELL W. ALLISON.

REFERENCES CITED

The following references are of record in the file of this patent:

UNITED STATES PATENTS

| Number | Name | Date |
|---|---|---|
| 1,979,020 | Whitney | Oct. 30, 1934 |
| 2,073,752 | Norton | Mar. 16, 1937 |
| 2,105,012 | Saunders | Jan. 11, 1938 |
| 2,208,765 | King | July 23, 1940 |
| 2,230,052 | Crocker | Jan. 28, 1941 |
| 2,261,485 | Peterson | Nov. 4, 1941 |
| 2,268,397 | Hersey | Dec. 30, 1941 |
| 2,302,587 | Ulrich | Nov. 17, 1942 |
| 2,333,485 | Molnar | Nov. 2, 1943 |
| 2,337,433 | Walsh | Dec. 21, 1943 |
| 2,340,554 | Peterson | Feb. 1, 1944 |
| 2,433,359 | Gohorel | Dec. 30, 1947 |